(12) United States Patent
McMurtry et al.

(10) Patent No.: US 8,028,647 B2
(45) Date of Patent: Oct. 4, 2011

(54) LIQUID FILM APPLICATOR ASSEMBLY AND RECTILINEAR SHEARING SYSTEM INCORPORATING THE SAME

(75) Inventors: David Harwood McMurtry, Felton, CA (US); Mikhail Vitoldovich Paukshto, Foster City, CA (US); Yuri A. Bobrov, Menlo Park, CA (US)

(73) Assignee: Fibralign Corporation, Sunnyvale, CA (US)

( * ) Notice: Subject to any disclaimer, the term of this patent is extended or adjusted under 35 U.S.C. 154(b) by 665 days.

(21) Appl. No.: 11/986,263

(22) Filed: Nov. 20, 2007

(65) Prior Publication Data

US 2008/0115724 A1     May 22, 2008

Related U.S. Application Data

(60) Provisional application No. 60/860,230, filed on Nov. 21, 2006.

(51) Int. Cl.
 *B29C 39/00* (2006.01)
 *B28B 3/00* (2006.01)
 *A01J 21/00* (2006.01)
 *A21C 11/00* (2006.01)
(52) U.S. Cl. ............ 118/100; 118/104; 425/87; 425/458
(58) Field of Classification Search .................. 425/458, 425/87; 118/100, 104
See application file for complete search history.

(56) References Cited

U.S. PATENT DOCUMENTS

| 3,114,165 | A | | 12/1963 | Koteles et al. |
| 3,203,021 | A | | 8/1965 | Pelick |
| 3,230,928 | A | * | 1/1966 | Stalmuke ...................... 118/413 |
| 4,299,789 | A | | 11/1981 | Giesbrecht |
| 4,476,806 | A | | 10/1984 | Lubniewski et al. |
| 4,607,829 | A | * | 8/1986 | Suska ............... 269/88 |
| 4,869,200 | A | * | 9/1989 | Euverard ..................... 118/200 |
| 5,205,306 | A | * | 4/1993 | Peterson .................... 134/104.2 |
| 6,174,394 | B1 | | 1/2001 | Gvon et al. |
| 6,848,897 | B2 | | 2/2005 | Lazarev et al. |
| 7,354,627 | B2 | | 4/2008 | Pedrozo et al. |
| 2001/0029887 | A1 | | 10/2001 | Falck et al. |
| 2002/0121239 | A1 | | 9/2002 | Tonazzi et al. |
| 2003/0017581 | A1 | | 1/2003 | Li et al. |
| 2004/0265493 | A1 | | 12/2004 | Mizuno et al. |
| 2005/0019488 | A1 | | 1/2005 | Braithwaite et al. |
| 2005/0123685 | A1 | * | 6/2005 | Frazzitta et al. ......... 427/428.01 |
| 2006/0163790 | A1 | * | 7/2006 | Xu et al. ........................ 269/32 |

FOREIGN PATENT DOCUMENTS

EP     1613458 A2     10/2004

OTHER PUBLICATIONS

Besseau, L. et al., "Production of Ordered Collagen Matrices for Three-Dimensional Cell Culture," Biomaterials, 23, 2002, pp. 27-36.

(Continued)

*Primary Examiner* — Dah-Wei Yuan
*Assistant Examiner* — Charles J Capozzi
(74) *Attorney, Agent, or Firm* — Nixon Peabody LLP

(57) ABSTRACT

A liquid coating applicator with a very precise means for controlling gap thickness as well as adapting to non-planar discontinuities in the substrate.

20 Claims, 7 Drawing Sheets

OTHER PUBLICATIONS

Clasen C. et al., "Microrheometry: Gap-Dependent Rheology and Tribology of Complex Fluids", Proc. XIV th Int. Congr. on Rheology, Aug. 2004, 3 pgs.

Chang, Yr. et al. "Three Minimum Wet Thickness Regions of Slot Die Coating", Journal of Colloid and Interface Science 308, 2007, pp. 222-230.

Cisneros, D. et al., "Creating Ultrathin Nanoscopic Collagen Matrices for Biological and Biotechnological Applications", Wiley InterScience, 2007, vol. 3, No. 6, pp. 956-963.

Fennell, L., et al., "Thin Crystal Film Polarizers," Asia Display/IDW'01, pp. 601-603.

Guo, C. et al., "Flow and Magnetic Field Induced Collagen Alignment", Biomaterials 28, 2007, pp. 1105-1114.

Knight, D. et al. "Biological Liquid Crystal Elastomers", Philosophical Transactions: Biological Sciences, vol. 357, No. 1418, Estomeric Proteins: Structures, Biomechanical Properties and Biological Roles. Feb. 28, 2002, pp. 155-163.

Ng, C. P., et al., "Fibroblast Alignment Under Interstitial Fluid Flow Using a Novel 3-D Tissue Culture Model", Am. J. Physical Heart Circ. Physiol 284: Jan. 16, 2003, pp. H1771-H1777.

Paukshto, M., et al., "Optics of Sheared Liquid-Crystal Polarizer Based on Aqueous Dispersion of Dichroic-Dye Nano-Aggregates", Journal of the SID, 13/9, 2005, pp. 765-772.

Tranquillo, R. "Exploiting Contact Guidance for Guided Nerve Regeneration and Growth of Aligned Cardiovascular Tissues", EMBO Workshop, Cell Migration, Tissue Invasion, and Disease, IGB Press, Oct. 14-17, 2006, pp. 32-34.

Zhong, S. et al., "An Aligned Nanofibrous Collagen Scaffold by Electrospinning and its Effects on In Vitro Fibroblast Culture", Journal of Biomedical Materials Research Part A, 2006 Wiley Periodicals, Inc., pp. 456-463.

International Search Report and Written Opinion for PCT/US2007/025037 dated Apr. 8, 2008.

International Search Report and Written Opinion for PCT/US2007/024238 dated Apr. 9, 2008.

International Preliminary Report on Patentability for PCT/US2007/024238 dated May 26, 2009.

\* cited by examiner

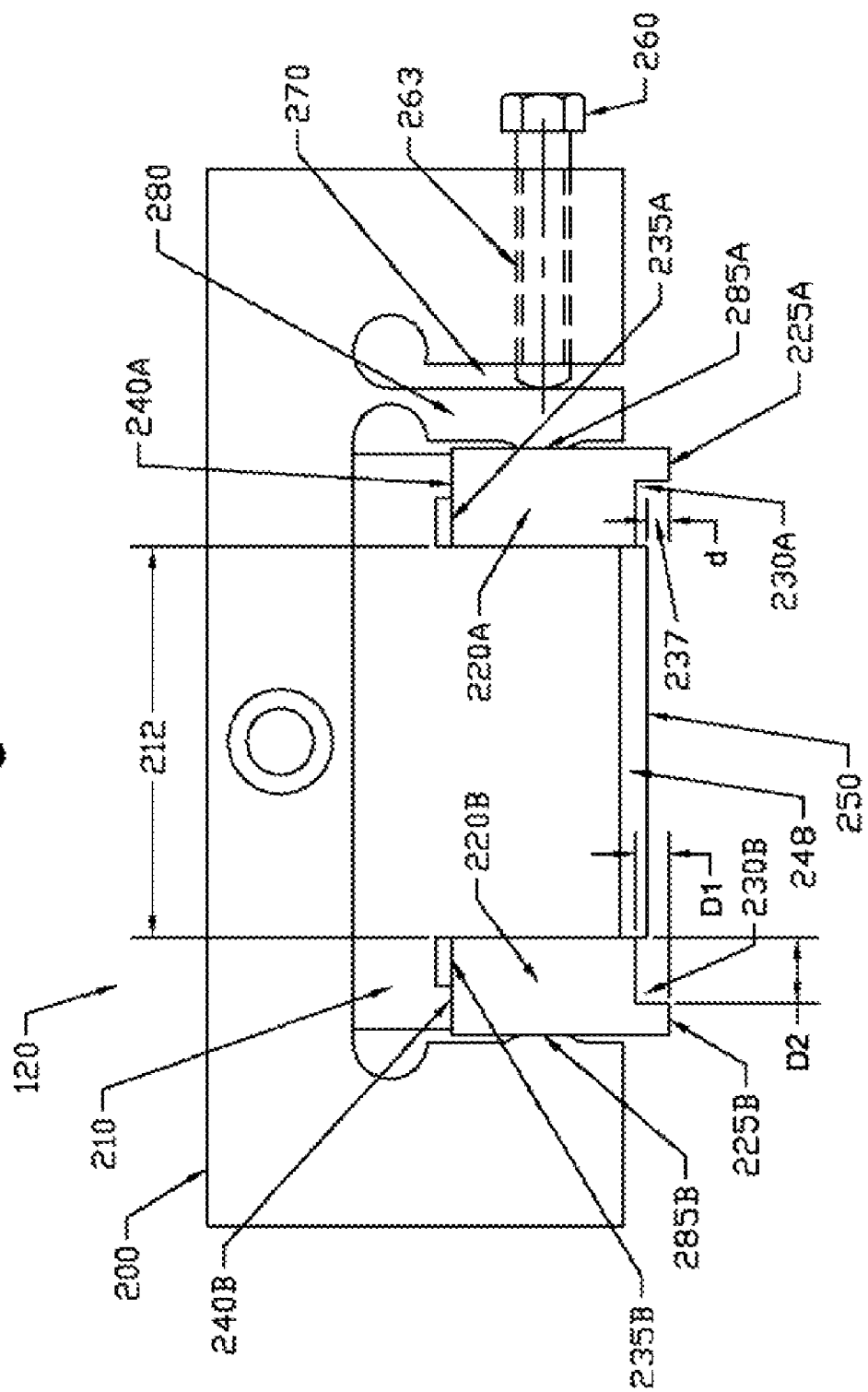

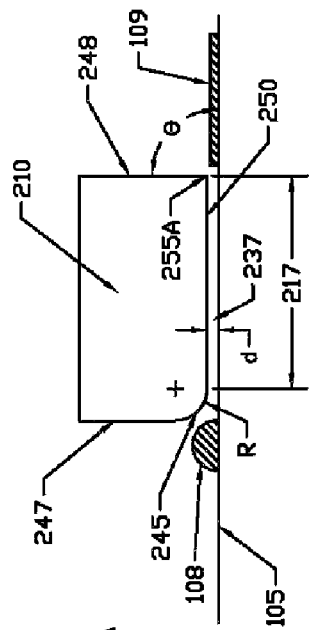
Fig 5A
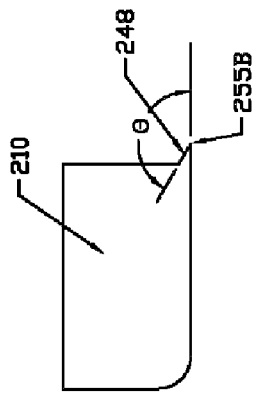
Fig 5B
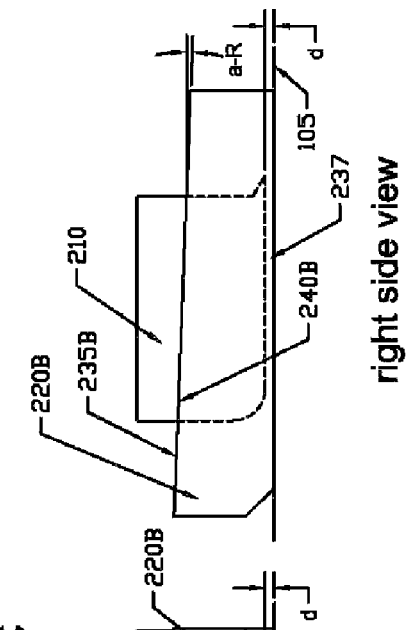
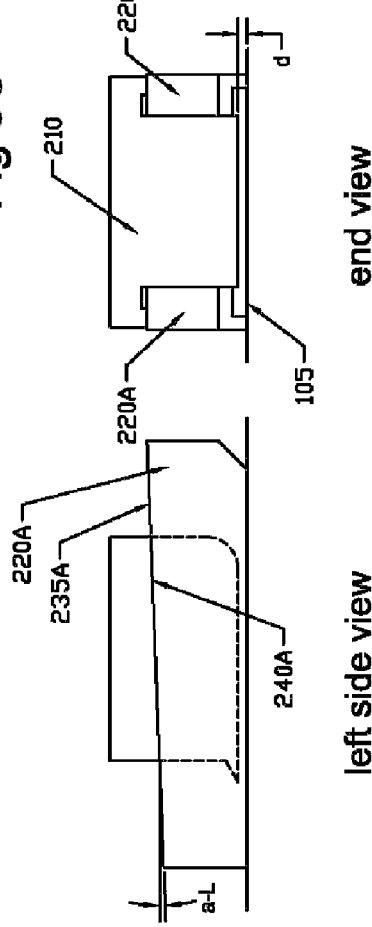
Fig 5C

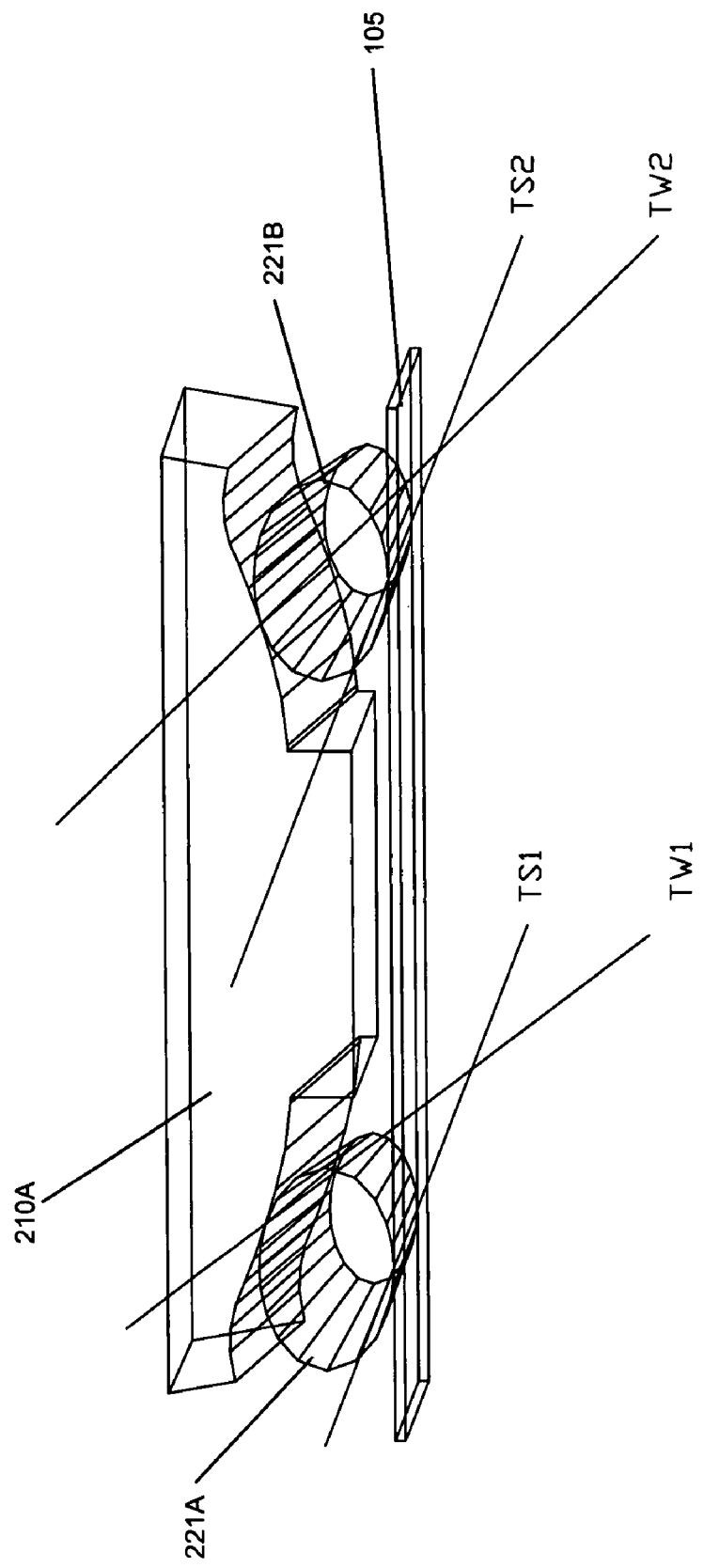

LIQUID FILM APPLICATOR ASSEMBLY AND RECTILINEAR SHEARING SYSTEM INCORPORATING THE SAME

RELATED APPLICATIONS

This application claims benefit of the provisional application 60/860,230 filed on 21 Nov. 2006.

FIELD OF THE INVENTION

The present invention refers to the field of formation of thin-film coatings using flowable substances. More specifically, the invention refers to facilities for obtaining thin films or coatings possessing anisotropic physical properties.

BACKGROUND OF THE INVENTION

Various types of wet film applicators, in particular, those used for testing paints, are known from the prior art. For the correct determination of some special properties of coatings such as color, transparency, luster, strength, resistance to weathering and chemical factors, etc., it is necessary to ensure that the test coatings applied in sequential runs would have the same preset thickness. In addition, it is desired that the applicator device would be adjustable so as to obtain the films of the desired thickness from various substances having varied physical properties.

One wet film applicator known from the prior art comprises a pair of wedge-shaped elements, which are parallel to each other and bear a transverse plane blade forming the coating. A gap between the bottom edge of the blade and the base plane (substrate) determines the thickness of the applied coating. The thickness of this gap is varied when the blade is moved along the wedge-shaped elements. Once the required gap thickness is set, the mutual arrangement of parts in the device is fixed. The blade is oriented perpendicularly to the direction of application and forms a film of desired thickness when the applicator is moved relative to the substrate surface. This device is quite universal and provides the level of accuracy that is sufficient for the formation of usual paint, lacquer, and other wet film coatings. In the clamping mechanism, the tightening screws directly presses against the blade which imparts a twisting motion to the blade However, neither this accuracy of this device nor (which is more important) the mode of device interaction with the applied liquid are sufficient for the formation of high-quality optically anisotropic films and coatings, especially such as are employed in modern multilayer interference devices.

Thin films with anisotropic optical properties, which are formed using liquid-crystalline solutions of organic dyes, are now widely used in science and technology. The molecules of these organic compounds have planar configuration and form orientation-ordered supramolecular complexes in solution. When a solution of these organic molecules is applied onto a substrate surface in the presence of an external orienting action (alignment), the resulting coating acquires a macroscopic orientation (optical anisotropy), which is not only retained in the course of subsequent drying but can even increase as a result of crystallization. The polarization axis is oriented along the direction of the aligning action, which coincides with the direction of application of the coating. Specific structural features of such optical films determine the need for developing special coating devices capable of forming precise thin layers with the required molecular orientation.

There are various known methods for the formation of optically anisotropic films and, accordingly, various devices which implement these methods. For example, liquid-crystalline solutions can be applied using a drawing plate or a wiper (squeegee), which can be of a blade (sheet) or cylinder type. The application of a liquid-crystalline solution onto a substrate surface can be performed simultaneously with the orientation of supramolecular complexes in a required direction. However, devices known in the prior art do not ensure the formation of highly anisotropic films with reproducible characteristics, which is explained by unavoidable disruption of the oriented molecular structure (defect production) during the film formation. In addition, the technology of film formation using the known devices requires prolonged preliminary work for determining the optimum application conditions for every batch of the initial raw materials.

Attempts at solving the aforementioned problems led to the creation of rather complicated devices, in particular, those containing liquid feed channels of special shapes, additional smoothing elements, etc.

Applicators known in the prior art also include devices of the slot-die coating system type such as the Sony setup (Alabama, USA), Cambridge Shearing System (Linkam Scientific, UK), sliding plate rheometers (FMR-MIT, USA), etc.

Patents depicting various devices of the prior art are U.S. Pat. No. 4,299,789, November 1981, Giesbrecht; U.S. Pat. No. 4,869,200, September 1989, Euverard; U.S. Pat. No. 6,174,394, 16/2001, Gvon et al.; WO 02/087782, July 2002, Lazarev et al.; and WO 02/056066, July 2002, Lazarev et al.

Despite the existing solutions, problems are still encountered that are related to the need for combining the necessary properties in one device, including high accuracy, simple adjustment, control over the film parameters (in particular, thickness), and the possibility to improve the quality of applied coatings by compensating for substrate unevenness.

The uniqueness of the device according to the present invention is the ability to obtain coatings of large areas at a high rate of application, low consumption of the raw material, and high-precision control over the film thickness and optical parameters (Mueller matrix, alignment, etc.). Additional important advantage of the proposed device is a sufficiently large size of the zone of shear action.

SUMMARY OF THE INVENTION

The present invention refers to devices intended for controlled coating substrate surfaces with liquid (flowable) substances and forming the desired material structure due to the shear between two planes sliding relative to each other. The aim of this invention is to obtain films with improved physical characteristics and increased reproducibility of results, not only over the area of single coating, but within a series of films formed from a single stock solution of coating liquid as well as from one batch to another.

A liquid coating device according to the present invention comprises (i) an applicator assembly, and a (ii) a compliant assembly for holding the applicator and compensating for unevenness in the surface of the substrate.

Though the combination of the two components above produces the best thin film coatings, it is possible to produce a thin film coatings with just the applicator assembly as discussed below The above system is typically used in conjunction with an essentially planar substrate, and a substrate holder with a means of linear transportation of the compliant assembly/ liquid film applicator relative to the substrate holder. For purpose of identifying various degrees of freedom, FIG. 2 identifies the proper orientation of the three axis Tx, Ty, and Tz with respect to the coating device and the three rotations about these axis: Rx, Ry, and Rz. The arrows indicate translation or rotation in the positive direction. The compliant assembly permits motion of the liquid film applicator in only three degrees of freedom, which are translation in the plus and minus Tz direction and rotation in the plus and minus directions: Rx and Ry.

The liquid film assembly is designed to be in direct physical contact with the substrate by way of the two parallel rails mounted on opposite sides of the bridge. A sample of the liquid to be coated is placed on the substrate along the front edge of the bridge. As the coating assembly is translated relative to the substrate, the coating liquid is drawn into the gap formed by the lower planar surface of the bridge and the substrate. Because of the compliant nature of the compliant assembly, the liquid film applicator will ride on the surface of the substrate and follow the minute variations in the surface of the substrate, limited by the three degrees of freedom discussed above.

This method makes possible the compensation of the linear and angular displacements arising during the system operation and ensures high homogeneity and smoothness of the applied film even on a rough (wavy) substrate. In the case of thin optical films, deviations of the substrate surface from the horizontal plane (waviness) can be comparable with the film thickness, which frequently leads to distortions and detrimentally influences the optical device performance. Retention of specific degrees of freedom described above in the Compliant Assembly 110 design allows the Applicator Assembly 120 to follow the substrate surface, thus increasing the uniformity of coating.

A liquid film applicator according to the present invention comprises
  (i) at least two longitudinal wedge-like rails with their bases occurring in the same plane called the base plane;
  (ii) a bridge which spans the two side members, which has at least one flat face and is in contact with each rail in at least one point; and
  (iii) a clamp system ensuring strict fixation of the bridge at any preset position in relation to the rails, such that a gap thickness of the desired dimension can be obtained The bridge can be moved along both rails so that the flat face of the bridge makes a certain constant dihedral angle within 0-10 arc minutes with the base plane, and the gap between this face and the base plane has a thickness from about 0 to about 100 microns. The bridge makes contact with each rail along the upper surface of the rail. The front flat face of the bridge makes a smooth continuous curved transition to the lower planar shear face with said transition typically being a one quarter circular arc having a radius of R.

The coating device according to the disclosed invention is a universal setup, which ensures excellent results at a relative simplicity of adjustment and high convenience in use. The disclosed coating device is capable of forming high precision coatings
  at shearing speeds of up to 1000 mm/sec;
  with very low coating liquid material consumption (less than 1 cc)
  Precisely controlled gap thickness (in the range 0-100 microns) and
  Long length of shearing zone (up to 30 mm)

BRIEF DESCRIPTION OF THE DRAWINGS

Having just described the invention in general terms, other and further objects, features, and advantages of the invention will be made more explicit from the following detailed description taken with reference to the drawings, which are not necessarily drawn to scale, and wherein:

FIG. 4 is a sectional view looking at the pointed Rear Surface of one embodiment of the Applicator Assembly.

FIG. 5A is side view of the bridge, the substrate and a sample of the liquid coating;

FIG. 5B is side view of the bridge showing the showing a Read Edge with a different theta angle;

FIG. 5C is a left side view, front face end view and a right side view of the bridge and rails showing the gap d and wedge angle a-L and a-R;

FIG. 6 is a wire frame model of showing a line of contact between the rails, the bridge and the substrate;

DETAILED DESCRIPTION OF THE INVENTION

Figure 1:
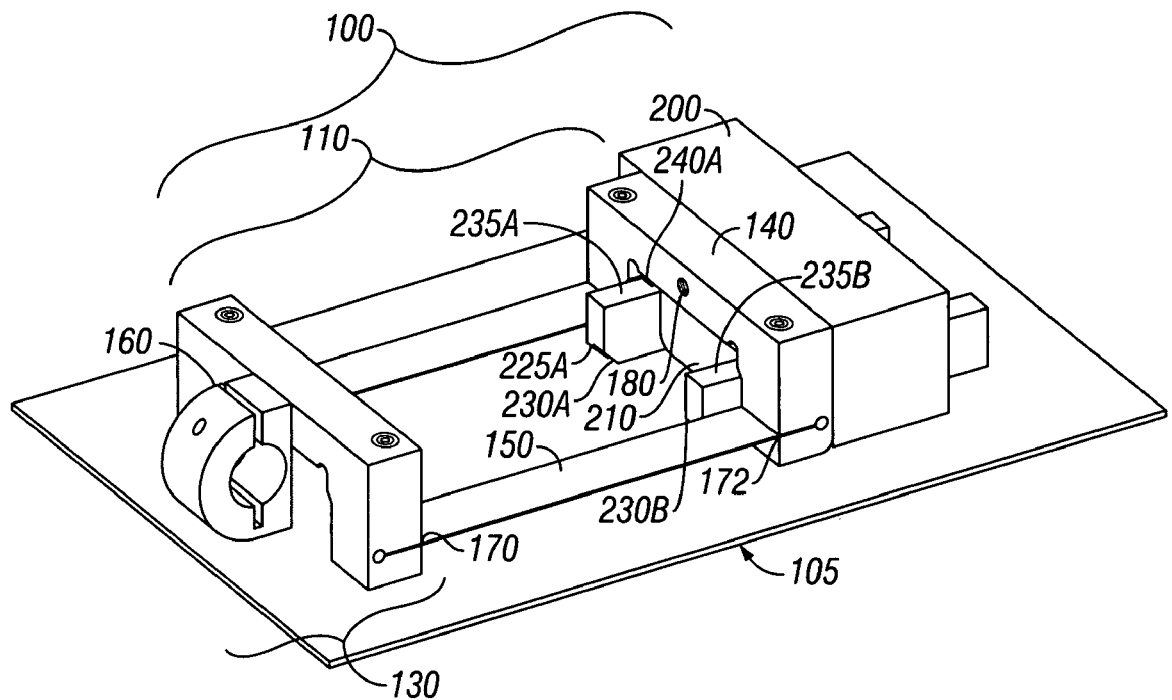
FIG. 1 is a perspective view of one embodiment the Coating Device of the present invention.
Figure 3:
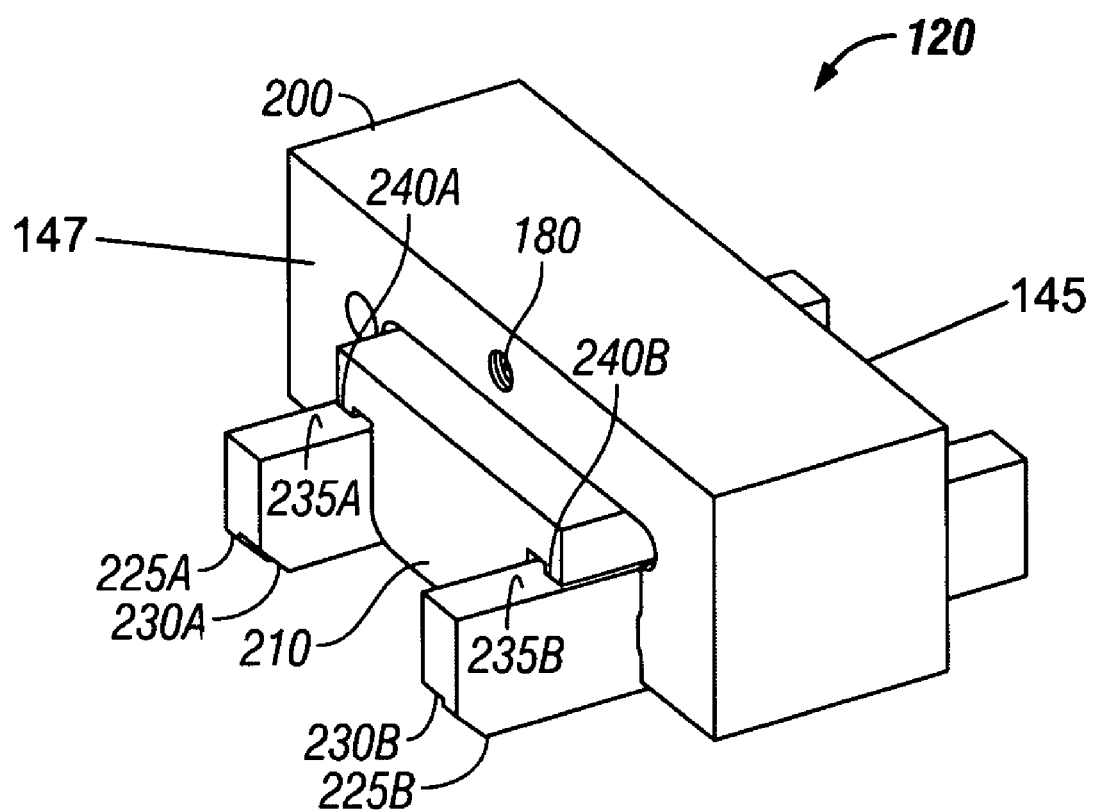
FIG. 3 is a perspective view of one embodiment of the Applicator Assembly.

Referring now primarily to FIG. 1 a Coating Device 100 according to the disclosed invention comprises an Applicator Assembly 120 (FIG. 3), and a Compliant Assembly 110.

Figure 2:
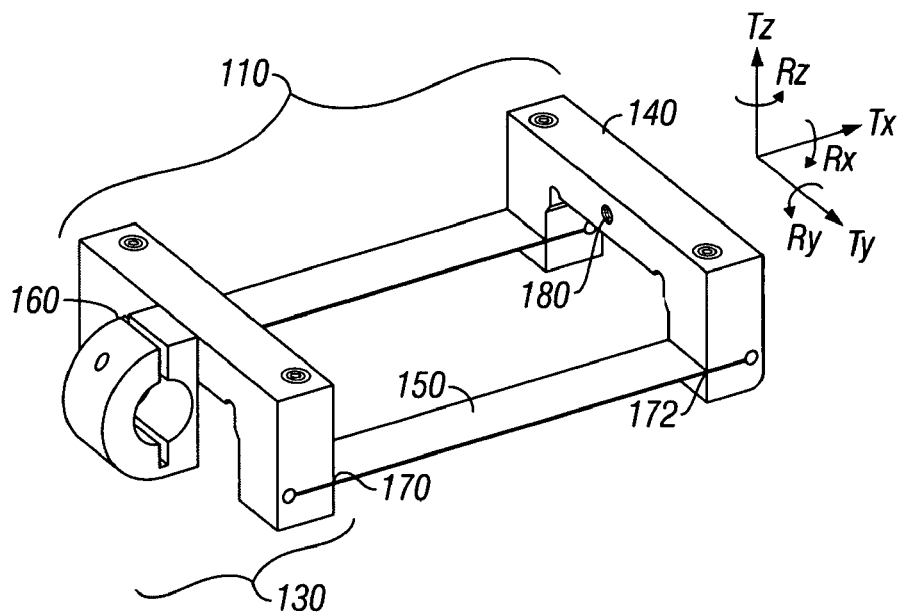
FIG. 2 is a perspective view of one embodiment of the Compliant Assembly.

The Applicator Assembly 120 is securely attached to one end of the Compliant Assembly 110 and the other end of Compliant Assembly is secured to fixed mechanical anchor (not shown) via Claim 160 on fixed member 130 (FIG. 2). Further details of both the Complaint Assembly and the Applicator Assembly will be discussed below.

The Coating Solution that is to be formed into a thin film is placed on the Substrate 105 just in front of Bridge 210. Then Substrate 105 is moved from left to right, causing Coating Solution 108 to be dragged under Applicator Assembly 120 causing Thin Film Coating 109 to be formed.

All references to motion and direction of motion of the substrate are to be understood to be relative to the coating device. It is possible to have the coating assembly fixed to an anchor and the substrate move. Alternatively it is possible to have the substrate fixed and move the coating assembly by attaching a mechanical means of motion to the coating device, preferably by way of the Clamp 160. A third possibility would be have both the substrate and the coating device actually moving. All three possibilities will be understood to be encompassed within references to motion of the substrate of the Coating Device 100.

Compliant Assembly 110, shown in both FIGS. 1 and 2, is attached to the Applicator 120. Compliant Assembly 110 provides a means to position the Applicator 120 relative to the Substrate 105. The transportation is usually performed using a worm mechanism with a step motor. However, embodiments of the present invention are not restricted to mechanisms of this type. Any means that ensures the smooth transport of the Coating Device 100 relative to Substrate 105, with the required velocity can be employed. The optimum relative velocity has to be selected taking into account the Theological properties of particular coating liquid.

The second important assembly of Coating Device 100 is the Applicator 120 (shown as part of the overall Coating Device 100 in FIG. 1 and by itself in FIGS. 3 and 4), which includes (i) at least two longitudinal Rails 220A and 220B. The lower portion of the Rails 220A/B make contact with the Substrate 105 along Contact Surfaces 225A and 225B. The Contact Surfaces 225A and 225B are narrower than the overall width of Rail 220A and 220B and thus form Rail Offsets 230A and 230B the upper surfaces of which are at a distance D1 (FIG. 4) from the Contact Surfaces 225A and 225B. The Rail Offsets also have a horizontal dimension D2 (FIG. 4). The distances D1 and D2 are preferably 0.02 to 0.5 inches.

The Rail Offsets 230A and 230B hinder the migration of Coating Liquid 108 which leaks from each edge of the Planar Shear Surface 250 facing each of the Rails 220A and 220B so that the Coating Liquid 108 tends to cling to these edges by capillary action and does not reach the interfaces between Contact Surfaces 225A and 225B and Substrate 105. If any Coating Liquid did get underneath the Contact Surfaces, the ability of the Applicator 120 to properly follow the surface of Substrate 105 would be compromised and thus the quality of the Coating 109 formed.

In the alternative, it is possible to have an equivalent offsets formed within each side of Bridge 210. Offsets located within the Bridge would function in exactly the same manner as the offsets shown in FIG. 4.

Located along the upper portion of each Rail are Rail Wedge Surfaces 235A and 235B respectively. This surface is angled with respect to the Contact Surfaces 225A and 225B. This angle is referred to as "a" and specifically "a-L" and "a-R", respectively, and is preferably in the range of 1 minute to 60 minutes.

(ii) Clamp 200 is designed for two primary functions. The first is to securely hold Bridge 210 and Rails 220A and 220B. Bridge 210 is mounted between the Rails 220A and 220B. Rails 220A and 220B make contact with Clamp Contact Surfaces 285A and 285B. Bridge 210 is positioned between the two Rails. All clearances are such that the Rails and the Bridge form a snug, but adjustable fit within Clamp 200. Once the Rails and Bridge are properly positioned (discussed below) they are securely tightened within Clamp 200. This is accomplished by tightening Claim Screws 260 in Threaded Hole 263 which then pushes against Claim Flex member 280. Clamp Slit 270 weakens the structure just enough to allow Clamp Flex member 280 to be biased against the Rails and the Bridge, thus holding them securely in place.

(iii) Bridge 210 is T-shaped structure that contacts the Rails along the inner parallel face of each of the Rails as well as along the upper Rail Wedge Surfaces 235A and 235B. Bridge 210 has two Bridge Wedge Surfaces 240A and 240B which are the surfaces which contact the Rail Wedge Surfaces 235A and 235B. The Bridge Wedge Surfaces 240A and 240B have the same slope as the Rail Wedge Surfaces 235A/235B. Thus when the two Rails are moved relative to the Bridge, they are urged in a vertical direction with respect to the lower flat surface of the bridge, Planar Shear Surface 250. Typically the Rails are adjusted so that they extend slightly beyond Planar Shear Surface 250. When the Applicator Assembly is placed on Substrate 105, this difference causes Gap 237 (FIG. 4, FIG. 5A and FIG. 5C) to be formed between Planar Shear Surface 250 and Substrate 105. Gap 237 has a thickness d when measured from the mid-point of the Planar Shear Surface to the Substrate 105.

It should be noted that it is critical that each mating pair of Bridge Wedge Surfaces 240A/Rail Wedge Surface 235A and Bridge Wedge Surfaces 240B/Rail Wedge Surface 235B have the same angle, but it is not critical that each pair has the same angle as the other pair.

Because the whole Applicator Assembly rides the substrate on the two Rails, the Planar Shear Surface 250 will be positioned above the surface of the Substrate 105. This gaps controls the thickness of the Coating 109.

The width of the bridge 212 (FIG. 4) is determined by the required width of the coating, while the length of the Shear Zone 217 (FIG. 5) is based in part upon the Theological properties of the coating liquid and relative velocity between Substrate 105 and Planar Shear Surface 250. The extended length of Shear Zone 217 is a significant feature and provides an important means of adapting the Applicator Assembly to Coating Liquids 108 having a wide variety of properties.

The Front Face 247 of the bridge makes a smooth continuous curved Transition Surface 245 to the Planar Shear Surface 250 with a curvature radius R of sufficient size to uniformly pull the Coating Liquid 108 into the gap and cause its homogeneous spreading under the Planar Shear Surface 250. The size of the radius R is dependant in part on the rheological properties of the Coating Liquid 108 and the relative velocity between the Planar Shear Surface 250 and the Substrate 105 and is typically greater than 50 microns. Though the smooth curved transition is shown in this embodiment as a ¼ radius circle, there is no requirement that the curved transition be circular, and other shapes and curvatures may be employed as the characteristics of the liquid solution dictate.

The Shear Zone 217 extends from point where the Transition Surface 245 meets the Planar Shear Surface 250 and the Rear Edge 255A and 255B.

The Planar Shear Surface 250 intersects with the smooth Rear Surface 248 at a sharp angle theta (See FIG. 5A and 5B) forming sharp Rear Edge 255A (FIG. 5A) of about 90 degrees or greater (e.g. Rear Edge 255B, FIG. 5B) such that a sharp Rear Edge 255A, 255B, which is devoid of irregularities, exists between said Planar Shear Surface 250 and said smooth Rear Surface 248 so as to avoid end-sticking of the wet layer to Rear Surface 248.

Figure 7:
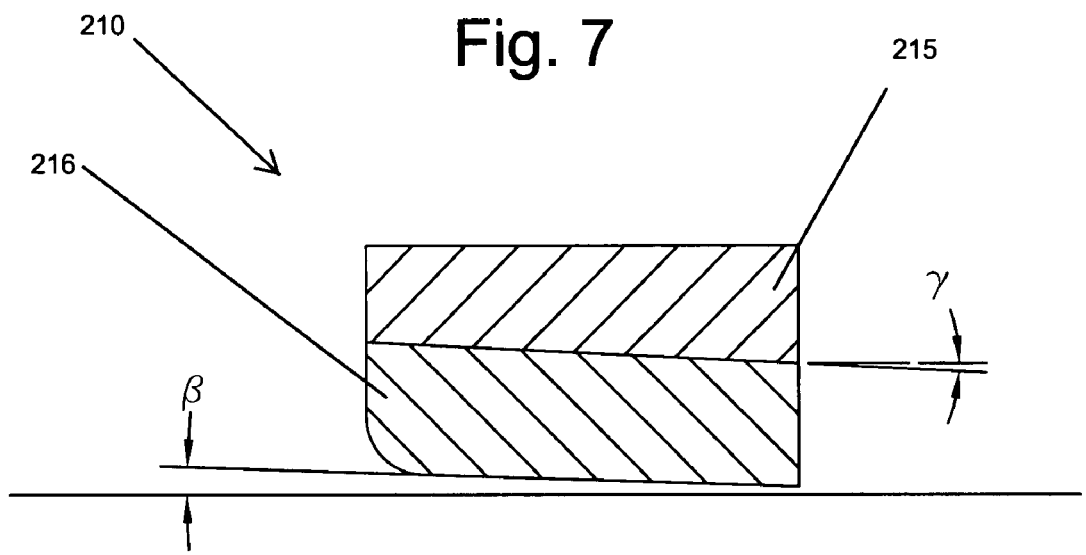
FIG. 7 is a sectional view of an alternative embodiment of the bridge.

The plane of the Planar Shear Surface 250 is usually parallel to the base plane. However, depending on the rheological properties of the coating liquid and the required parameters of coating, the Planar Shear Surface 250 can make an angle β (FIG. 7) that is typically within 10-30 arc minutes with the base plane (the front edge can be either higher or lower than the rear edge). By varying this angle, it is possible to control the shear stress on the Coating Liquid 108 lying with the gap and change the mode of application and release of this stress. The angle between the Planar Shear Surface 250 and the base plane is usually changed by replacing the whole Bridge 210.

The Planar Shear Surface 250 must be a smooth and have a mirror-like surface and flat to within 1-3 wavelengths over the entire surface (0.3-1 micron)

Gap 237 between the Planar Shear Surface 250 and the Substrate 105 has a thickness d which is typically within the range of about 0 microns to about 100 microns. Thickness d of Gap 237 can be changed by precisely shifting the Rails with respect to the Bridge 210. Because the Rails are longer than the depth of the Clamp and Bridge, the Rails can be positioned anywhere along their length. However, the Bridge 210 is typically centered, front to back within the Clamp 200. The wedge angle a, must provide for the smooth control and precise setting of the gap thickness and with the required accuracy (typically, about 20 nm). When it is necessary to change the parameters and/or thickness of the applied coating, the Applicator 120 is removed from the Coating Device 100 and placed upside down with the Contact Surfaces 225A/225B and the Planar Shear Surface 250 facing upwards.

Initially the rails are adjusted so that the Contact Surfaces 225A/225B and Planar Shear Surface 250 are all coplanar. Then because, the wedge angle a is known, the Rails 220A/220B can be moved a precise distance relative to the bridge, which translates into the desired change in the distance between the plane formed by the Contact Surfaces 225A/225B and Planar Surface 250.

The actual gap distance can be measured and confirmed by measuring an interference pattern that arises due to multiple reflection of a light beam between the Planar Shear Surface 250 and a glass plate used for the testing which rests upon the Contact Surfaces 225A/225B In one possible alternative embodiment (FIG. 7), the Bridge 210 is made up of two wedge-like elements (215 and 216), which allow for a relative shift along the slippage plane, which is inclined relative to the base plane at an angle γ, which is smaller than angle a. This alternative design of the Bridge 210 member is convenient for the additional fine adjustment of the gap thickness d.

In second alternative embodiment of the Bridge 210, some or all of the material forming Bridge 210 can be a essentially transparent.

Although most depictions of the Bridge 210 shown herein have the bridge made of a single monolithic member, it is within the scope of the invention that the Bridge 210 could be made of two or more elements as long as the assembly of these components provides the same functionality as a monolithic bridge.

Figure 8:
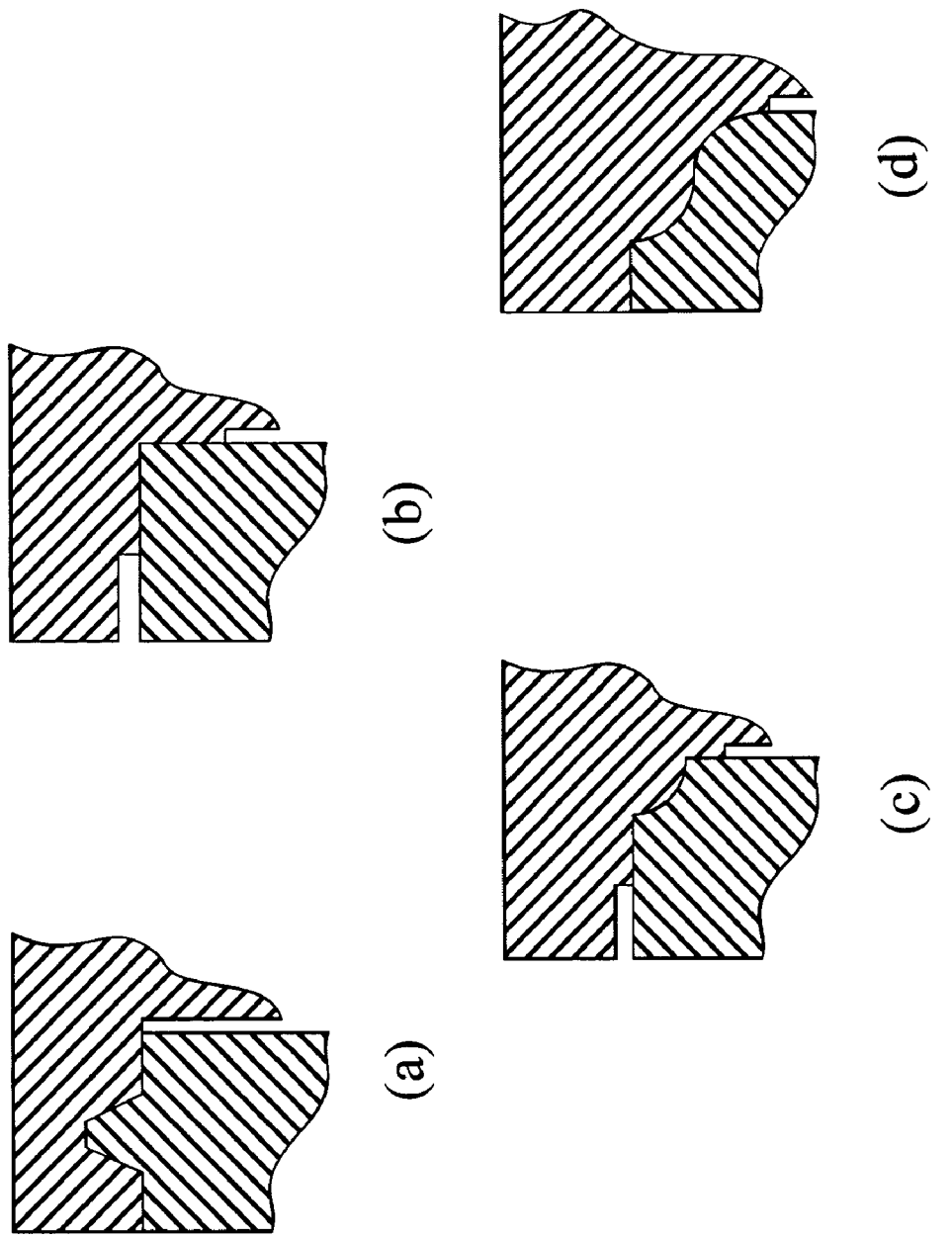
FIG. 8 is a sectional view of various configurations of the contact surfaces between the bridge the upper surfaces of the rails.

The site of the contact between the Bridge Wedge Surfaces and the Rail Wedge Surfaces must, on the one hand, ensure a reliable and strong structure of the Applicator Assembly 120 and, on the other hand, provide for their free and high-precision mutual displacement. FIG. 8 shows a cross section of four alternative embodiments of the contact sites, which can provide for the required quality and properties of these contact surfaces. However, the possible embodiments are not restricted to these variants and admit any other structures which provide the needed physical requirements.

The liquid film applicator according to the present invention usually employs two identical wedge-like rails. However, embodiments incorporating other configurations of wedge-like rails are possible as well.

A schematic depiction of the minimum requirement for the Bridge and Rail contact surfaces is shown in FIG. 6. The minimum required contacts between Bridge 210A and Rail 221A and 221B is shown as line TW1 and TW2. Likewise the minimum required contact between Rail 221A and 221B and Substrate 105 are depicted as lines TS1 and TS2. All references to contact surfaces and contact between contact surfaces contained herein shall be understood to include at least one line of contact between the surfaces. Though the contact surfaces as shown in the various embodiment contained herein are shown as flat surfaces, such contact surfaces may include any number of configurations as long as there is a single line of contact between the surfaces.

Though the best films can be performed when the Compliant Assembly 110 "drags" the Applicator Assembly 120 across the substrate, it is possible to attach the Compliant Assembly 110 to Clamp 200 by rotating Compliant Assembly 180° around the Tz axis (from its position shown in FIG. 1 where Compliant Member 140 having female thread 180 is attached to Inner Face 147) and attaching Compliant Member 140 to Outer Face 145 (FIG. 3) of Clamp 200. Then Compliant Assembly 110 can "push" Applicator Assembly to control/limit the movement of the Applicator Assembly 120 to the three degrees of freedom previously discussed. It should be noted that the stress on the system in this configuration must be kept below the buckling limit of Flex Members 150.

Applications:

Preferred coating liquids for the formation of anisotropic optical films include liquid colloidal systems containing anisometric particles, in particular, lyotropic liquid crystals of organic dyes. Examples are offered by organic dyes such as indanthrone (Vat Blue 4), 1,4,5,8-naphthalenetetracarboxylic acid dibenzimidazole (Vat Red 14), 3,4,9,10-perylenetetracarboxylic acid dibenzimidazole, and quinacridone (Pigment Violet 19), and some other whose derivatives or their mixtures are capable of forming stable lyotropic liquid crystal phases.

When such an organic compound is dissolved in an appropriate solvent, a colloidal system (liquid-crystalline solution) is formed, in which organic molecules combine to form c representing kinetic units of the colloidal system. A liquid-crystalline liquid is a preferred coating liquid, from which a desired anisotropic crystalline film (also called thin-film crystal) is formed in the course of application, orientation of the liquid-crystalline solution, and subsequent removal of the solvent.

This colloidal system must possess the property of thixotropy, whereby the viscosity of the medium at a preset temperature and a given concentration of the dispersed phase can by changed by applying an external action. The type and degree of this action must be sufficient to provide that the kinetic units of the colloidal system could acquire the necessary orientation and form a base structure for the required film. The direct action upon the coating liquid and the formation of a wet film is performed by the liquid film applicator (FIG. 3, 120) as it moves along the substrate (105). Special features of the liquid film applicator design allow this device to produce the necessary orienting action upon the material structure and to form an even wet layer of preset thickness with a smooth surface.

Anisotropic optical films can also be formed using inorganic lyotropic liquid crystals, for example, based on iron oxohydroxide or vanadium oxide, which possess anisotropic electrical and magnetic properties.

Use of the present invention is by no means restricted to the formation of coatings based on of liquid-crystalline and colloidal systems with anisometric particles. Any liquid capable of forming a coating on the given substrate can be applied using this system as well.

The possible substrate materials are plastics, glass, and other materials, including polymeric films. Prior to film application, the substrate usually treated by certain means (e.g., corona discharge, surfactants, etc.) to render it homogeneously hydrophilic over the entire surface. A substrate holder may be employed, which is usually a vacuum table, which reliably ensures that the substrate is immobile during the film application and provides leveling of the substrate surface.

To those skilled in the art it will be understood that there can be many other variations of the embodiments what have been described above while still achieving the same objectives of the invention. Such variations are intended to be covered by the scope of this invention. As such, the foregoing description of embodiments of the invention is not intended to be limiting. Accordingly, it is intended that the appended claims will cover all modifications of the invention that fall within the true spirit and scope of the invention.

What is claimed is:

1. A coating device comprising:
   a. a compliant assembly comprising
      a fixed member having an anchor attachment clamp, and adapted to securely receive one or more flex strips;
      a compliant member having an inner surface, and outer surface and a lower surface, said compliant member adapted to securely receive a liquid film applicator and one or more flex strips;
      each of said fixed member and compliant member having an inner and an outer surface; the two inner surfaces facing towards each other and each outer surface oriented away from each other; and
      one or more flex strips securely mounted between said fixed member and said compliant member wherein said compliant member is free to translate in the positive and negative Tz direction and rotate in both a positive and negative direction about the Rx axis and the Ry axis; and
   b. a liquid coating applicator comprising;
      a left and a right longitudinal side member each having the form of a wedge-like rail; each side member having an upper surface and a base surface with said base surfaces of the two side members forming a base plane and the upper surface of said left side member forming an angle a-L with respect to said base surface of said left side member and the upper surface of said right side member forming an angle a-R with respect to said base surface of said right side member;
      a bridge having a planar shear surface, a front surface, a rear surface, a rear edge, and a transition surface; said bridge having a left and a right bridge wedge surfaces; said left bridge wedge surface forming an angle a-L with respect to said planar shear surface and said right bridge wedge surface forming an angle a-R with respect to said planar shear surface;
      a clamp member adapted to adjustably and fixedly secure the bridge and each of said side members such that said bridge is positioned between the two side members such that base surface of each of said rails and the planar shear surface of the bridge are approximately co-planar and the distance d from the base plane to the mid-point of the planar shear surface being greater than or equal to about 0 microns; each of said upper surfaces of said left and right side members being in contact with one of said left and right bridge wedge surfaces respectively; wherein distance d can be altered by repositioning said side members with respect to said bridge prior to securing said side members and said bridge within said clamp; and when a coating liquid is disposed upon a substrate and said liquid coating applicator and the substrate are translated relative to each other such that the substrate moves toward said front surface of said bridge a liquid coating is formed on the substrate;
      said outer surface of said compliant member is attached to one side of said clamp and said lower surface of said compliant member is higher than said base plane; and
      wherein when said coating device is moved relative to a substrate the liquid coating applicator is compliant with changes in the surface of the substrate.

2. The coating device of claim 1 wherein the planar shear surface is flat in the range of about 1 to 3 wavelengths of visual light over its surface.

3. The coating device according to claim 1 wherein said transition surface is a curved surface connecting said front surface of the bridge and said planar shear surface of said bridge.

4. The coating device according to claim 3 wherein said transition surface has a radius of at least 50 microns.

5. The coating device according to claim 1 wherein said bridge comprises an upper bridge member and a lower bridge member having mating surfaces wherein the mating surfaces form an angle gamma degrees with respect to the planar shear surface.

6. The coating device according to claim 5 wherein said angle gamma is less than angle a-L or a-R.

7. The coating device according to claim 1 wherein said planar shear surface forms an angle of less than 2 degrees with said base plane.

8. The coating device according to claim 7 wherein said planar shear surface forms an angle of less than 10-arc minutes with said base plane.

9. The coating device according to claim 8 wherein said planar shear surface is parallel to said base plane.

10. The coating device according to claim 1 wherein said angle a-L equals a-R.

11. The coating device according to claim 1 wherein said distance d can be adjusted to be in the range of about 0 to about 100 microns.

12. The coating device according to claim 2 wherein said rear surface makes an angle with said planar shear surface of at least about 90 degrees.

13. The coating device according to claim 1 wherein said rear surface makes an angle with said planar shear surface in the range of about 90 degrees to about 135 degrees.

14. The coating device according to claim 1 wherein the length of said shear zone is in the range of about 0.25 inches to about 2 inches.

15. The coating device according to claim 1 wherein the length of said shear zone is greater than d.

16. The coating device according to claim 1 wherein said longitudinal side members are parallel.

17. The coating device according to claim 1 further comprising an offset in the lower surface of each of said longitudinal side members, said offsets having a horizontal and vertical dimension which are optimized to minimize capillary creep of a coating liquid.

18. The coating device according to claim 1 further comprising an offset in left and right lower surface of said bridge, said offsets having a horizontal and vertical dimension which are optimized to minimize capillary creep of a coating liquid.

19. A coating device as described in claim 1 wherein said outer surface of said compliant member is attached to one side of said clamp such that the front surface of said bridge is directly facing said outer surface of said compliant member.

20. A coating device as described in claim 1 wherein said outer surface of said compliant member is attached to one side of said clamp such that the rear surface of said bridge is directly facing said outer surface of said compliant member.

* * * * *